US011226914B2

(12) United States Patent
Malladi et al.

(10) Patent No.: US 11,226,914 B2
(45) Date of Patent: *Jan. 18, 2022

(54) HETEROGENEOUS ACCELERATOR FOR HIGHLY EFFICIENT LEARNING SYSTEMS

(71) Applicant: Samsung Electronics Co., Ltd., Suwon-si (KR)

(72) Inventors: Krishna T. Malladi, San Jose, CA (US); Hongzhong Zheng, Los Gatos, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 16/595,452

(22) Filed: Oct. 7, 2019

(65) Prior Publication Data

US 2020/0042477 A1  Feb. 6, 2020

Related U.S. Application Data

(63) Continuation of application No. 15/825,047, filed on Nov. 28, 2017, now Pat. No. 10,474,600.

(Continued)

(51) Int. Cl.
*G06F 13/28* (2006.01)
*G06F 9/445* (2018.01)
(Continued)

(52) U.S. Cl.
CPC .............. *G06F 13/28* (2013.01); *G06F 9/445* (2013.01); *G06F 9/4806* (2013.01); *G06F 2015/768* (2013.01)

(58) Field of Classification Search
CPC ............ G11C 11/4091; G11C 11/4096; G11C 7/1006; G06F 12/0811; G06F 12/084;
(Continued)

(56) References Cited

U.S. PATENT DOCUMENTS 5,918,248 A * 6/1999 Newell ................. G06F 9/5016
711/147
6,794,273 B2   9/2004 Saito et al.
(Continued)

FOREIGN PATENT DOCUMENTS

JP   2003347470 A   12/2003
JP   2010080802 A    4/2010
(Continued)

OTHER PUBLICATIONS

Final Office Action for U.S. Appl. No. 15/825,047, dated Oct. 23, 2018.
(Continued)

*Primary Examiner* — Faisal M Zaman
(74) *Attorney, Agent, or Firm* — Renaissance IP Law Group LLP

(57) ABSTRACT

An apparatus may include a heterogeneous computing environment that may be controlled, at least in part, by a task scheduler in which the heterogeneous computing environment may include a processing unit having fixed logical circuits configured to execute instructions; a reprogrammable processing unit having reprogrammable logical circuits configured to execute instructions that include instructions to control processing-in-memory functionality; and a stack of high-bandwidth memory dies in which each may be configured to store data and to provide processing-in-memory functionality controllable by the reprogrammable processing unit such that the reprogrammable processing unit is at least partially stacked with the high-bandwidth memory dies. The task scheduler may be configured to schedule computational tasks between the processing unit, and the reprogrammable processing unit.

16 Claims, 7 Drawing Sheets

Related U.S. Application Data

(60) Provisional application No. 62/558,745, filed on Sep. 14, 2017.

(51) Int. Cl.
  *G06F 9/48* (2006.01)
  *G06F 15/76* (2006.01)

(58) Field of Classification Search
  CPC ....... G06F 2212/1024; G06F 2212/283; G06F 15/7821
  USPC .................................... 711/154, 106; 712/14
  See application file for complete search history.

(56) References Cited

U.S. PATENT DOCUMENTS

| | | | |
|---|---|---|---|
| 7,219,214 B2 * | 5/2007 | Ford | G06F 9/30032 711/154 |
| 7,834,440 B2 | 11/2010 | Ito et al. | |
| 8,041,852 B1 | 10/2011 | Mattson et al. | |
| 8,737,108 B2 | 5/2014 | Saraswat et al. | |
| 8,874,943 B2 | 10/2014 | Majumdar et al. | |
| 9,110,778 B2 | 8/2015 | Fleischer et al. | |
| 9,304,730 B2 | 4/2016 | Bittner et al. | |
| 10,474,600 B2 * | 11/2019 | Malladi | G06F 13/28 |
| 10,825,496 B2 | 11/2020 | Murphy | |
| 11,036,509 B2 | 6/2021 | Sperber et al. | |
| 2003/0046530 A1 * | 3/2003 | Poznanovic | G06F 15/7867 713/100 |
| 2003/0212509 A1 * | 11/2003 | Henry | G01F 1/8427 702/45 |
| 2004/0230771 A1 * | 11/2004 | Borgatti | G11C 16/30 712/34 |
| 2007/0294514 A1 | 12/2007 | Hosogi et al. | |
| 2008/0016374 A1 | 1/2008 | Gee et al. | |
| 2008/0114937 A1 | 5/2008 | Reid et al. | |
| 2010/0268788 A1 * | 10/2010 | Arimilli | G06F 9/54 709/213 |
| 2013/0138886 A1 * | 5/2013 | Yamauchi | B29C 49/062 711/120 |
| 2014/0040532 A1 | 2/2014 | Watanabe et al. | |
| 2014/0129753 A1 | 5/2014 | Schuette et al. | |
| 2014/0181453 A1 | 6/2014 | Jayasena et al. | |
| 2014/0380003 A1 | 12/2014 | Hsu et al. | |
| 2015/0020078 A1 | 1/2015 | Kuesel et al. | |
| 2015/0095896 A1 | 4/2015 | Jiang et al. | |
| 2015/0143003 A1 * | 5/2015 | Trout | G06F 3/061 710/104 |
| 2015/0237058 A1 * | 8/2015 | Chritz | H04L 63/0428 726/23 |
| 2015/0305044 A1 | 10/2015 | Wigren et al. | |
| 2016/0078023 A1 * | 3/2016 | Schalk | G06F 16/2282 707/825 |
| 2016/0092274 A1 | 3/2016 | Singh et al. | |
| 2016/0098200 A1 | 4/2016 | Guz et al. | |
| 2016/0371081 A1 | 12/2016 | Powers et al. | |
| 2016/0379115 A1 | 12/2016 | Burger et al. | |
| 2017/0016933 A1 * | 1/2017 | Richardson | G01Q 10/06 |
| 2017/0177235 A1 * | 6/2017 | Nishikubo | G06F 3/0656 |
| 2017/0255390 A1 * | 9/2017 | Chang | G06F 3/0635 |
| 2017/0255496 A1 | 9/2017 | Deng et al. | |
| 2017/0315846 A1 | 11/2017 | Wang et al. | |
| 2018/0081583 A1 * | 3/2018 | Breternitz | G06F 9/30 |
| 2018/0107406 A1 * | 4/2018 | O | G06F 3/0683 |
| 2018/0115496 A1 * | 4/2018 | Eckert | G06F 9/5066 |
| 2018/0130780 A1 | 5/2018 | Gonzales et al. | |
| 2018/0173619 A1 * | 6/2018 | Sivasankaran | G06F 12/0246 |
| 2018/0239702 A1 * | 8/2018 | Farmahini Farahani | G06F 12/0837 |
| 2018/0267860 A1 * | 9/2018 | Foster | G06F 12/0646 |

FOREIGN PATENT DOCUMENTS

| | | |
|---|---|---|
| JP | 2015533009 A | 11/2015 |
| JP | 2016209406 A | 12/2016 |
| TW | 201612753 A | 4/2016 |
| TW | 201626207 A | 7/2016 |
| TW | 201729074 A | 8/2017 |

OTHER PUBLICATIONS

Notice of Allowance for U.S. Appl. No. 15/825,047, dated Jul. 3, 2019.

Office Action for U.S. Appl. No. 15/825,047, dated Jul. 23, 2018.

Office Action for U.S. Appl. No. 15/825,047, dated Mar. 8, 2019.

\* cited by examiner

HETEROGENEOUS ACCELERATOR FOR HIGHLY EFFICIENT LEARNING SYSTEMS

CROSS-REFERENCE TO RELATED APPLICATION

This application is a continuation of, and claims priority under 35 U.S.C. § 120 to, application Ser. No. 15/825,047, filed on Nov. 28, 2017 which claims priority under 35 U.S.C. § 119 to Provisional Patent Application Ser. No. 62/558,745, entitled "A HETEROGENEOUS ACCELERATOR FOR HIGHLY EFFICIENT LEARNING SYSTEMS" filed on Sep. 14, 2017. The subject matter of this earlier filed application is hereby incorporated by reference.

TECHNICAL FIELD

This description is generally related to circuits. In particular, the present disclosure relates to a system and method for a heterogeneous accelerator for highly efficient learning systems.

BACKGROUND

Emerging applications like learning systems, such as, for example, deep neural networks often need massive computational and memory abilities to train on different datasets and learn with high accuracy. Moreover, as applications like high-performance computing, graphics operations, etc. become data and compute intensive, energy-efficiency and low latency become critical. A technique known as "processing in memory" has the ability to addresses these challenges by scheduling the complex operations on memory (e.g., dynamic random access memory (DRAM), etc.) logic dies to provide additional compute abilities, in a lower-power technology process and also closer to where the data resides.

High Bandwidth Memory (HBM) is a high-performance random access memory (RAM) interface for 3D-stacked memories (e.g., DRAM). It is often used in conjunction with high-performance graphics accelerators and network devices which access large datasets. HBM generally achieves higher bandwidth while using less power in a substantially smaller form factor than other DRAM technologies (e.g., double data rate fourth-generation synchronous dynamic random-access memory (DDR4), double data rate type five synchronous graphics random-access memory (GDDR5), etc.). This is often achieved by stacking a number (e.g., eight) memory dies together. Frequently this stack also includes an optional base die with a memory controller. The dies may be interconnected by through-silicon vias (TSV) and microbumps.

SUMMARY

According to one general aspect, an example embodiment provides an apparatus that may include a heterogeneous computing environment that may be controlled, at least in part, by a task scheduler in which the heterogeneous computing environment may include a processing unit having fixed logical circuits configured to execute instructions; a reprogrammable processing unit having reprogrammable logical circuits configured to execute instructions that include instructions to control processing-in-memory functionality; and a stack of high-bandwidth memory dies in which each may be configured to store data and to provide processing-in-memory functionality controllable by the reprogrammable processing unit such that the reprogrammable processing unit is at least partially stacked with the high-bandwidth memory dies. The task scheduler may be configured to schedule computational tasks between the processing unit, and the reprogrammable processing unit.

According to another general aspect, another example embodiment provides an apparatus that may include a heterogeneous computing environment that may be controlled, at least in part, by a central processing unit in which the heterogeneous computing environment may include the central processing unit, a fixed processing unit, a reprogrammable processing unit, a stack of high-bandwidth memory dies, and a central memory. The central processing unit may be configured to assign computational tasks between a fixed processing unit, and a reprogrammable processing unit. The fixed processing unit may have fixed logical circuits configured to execute instructions. The reprogrammable processing unit may have reprogrammable logical circuits configured to execute instructions that include instructions to control processing-in-memory functionality. Each stack of high-bandwidth memory dies may be configured to store data and to provide processing-in-memory functionality controllable by the reprogrammable processing unit such that the reprogrammable processing unit is at least partially stacked with the high-bandwidth memory dies. The central memory may include a buffer portion reserved for the fixed processing unit, and a buffer portion reserved for the reprogrammable processing unit.

According to another general aspect, still another example embodiment provides a system that may include a central processing unit, a system memory and a heterogeneous accelerator. The central processing unit may be configured to assign computational tasks to processing units of a heterogeneous computing environment. The system memory may be configured to store data. The heterogeneous accelerator multi-chip module may include the heterogeneous computing environment in which the heterogeneous accelerator multi-chip module may include a fixed processing unit having fixed logical circuits configured to execute instructions, a reprogrammable processing unit having reprogrammable logical circuits configured to execute instructions that include instructions to control processing-in-memory functionality, and a stack of high-bandwidth memory dies, each configured to store data and to provide processing-in-memory functionality controllable by the reprogrammable processing unit such that the reprogrammable processing unit may be at least partially stacked with the high-bandwidth memory dies.

The details of one or more implementations are set forth in the accompanying drawings and the description below. Other features will be apparent from the description and drawings, and from the claims.

A system and/or method for a system and method for a heterogeneous accelerator for highly efficient learning systems, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
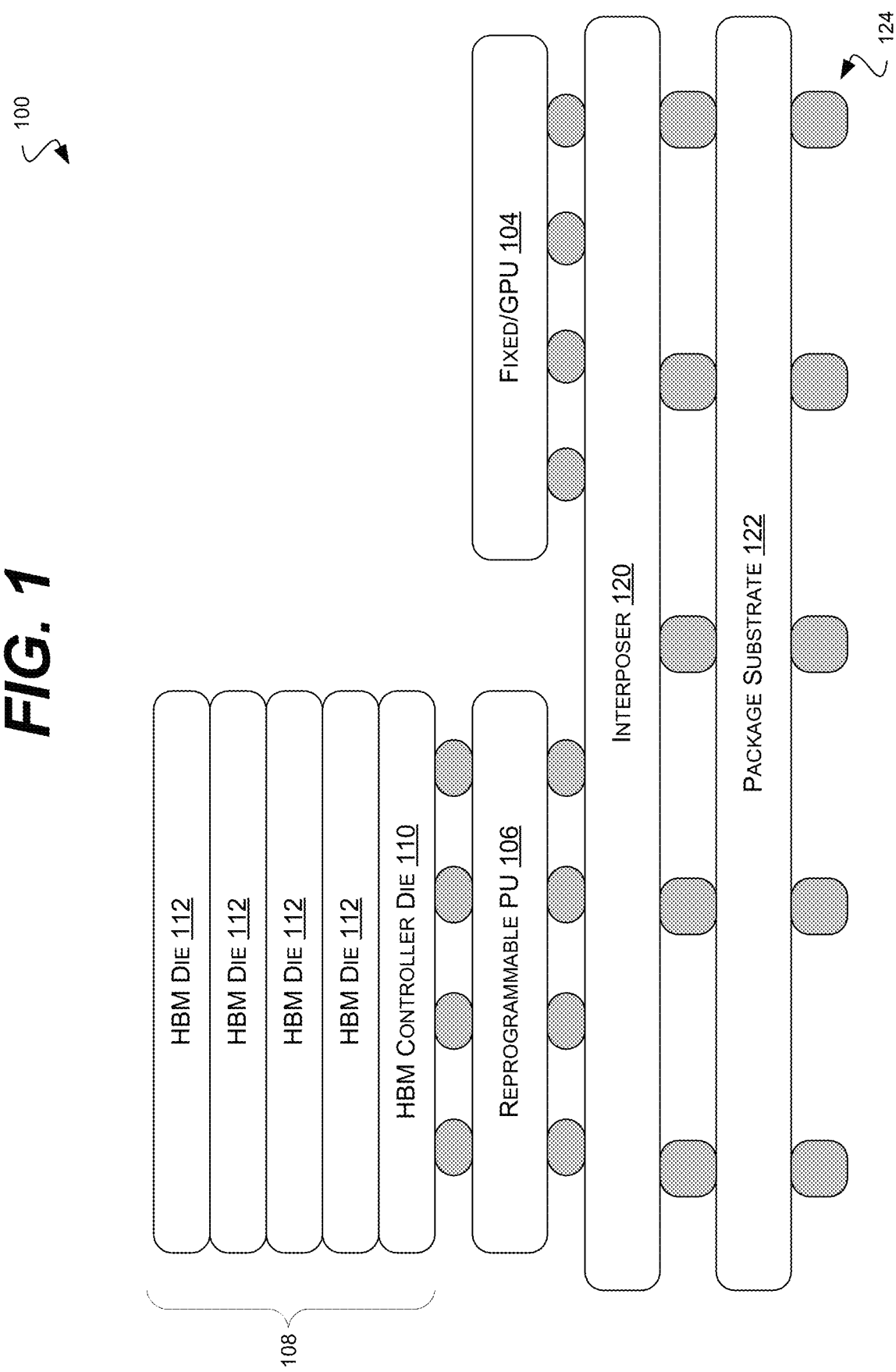
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In the illustrated embodiment, the system 100 may include a plurality of integrated circuit (IC) dies. In such an embodiment, the ICs may be arranged in a multi-chip module (MCM).

A MCM is often an electronic assembly (such as a package with a number of conductor terminals or "pins") where multiple integrated circuits (ICs or "chips"), semiconductor dies and/or other discrete components are integrated, usually onto a unifying substrate, so that in use it is treated as if it were a single component (as though a larger IC). It is understood that the above is merely one illustrative example to which the disclosed subject matter is not limited.

In the illustrated embodiment, the system 100 may include a stack 108 of high-bandwidth memories (HBMs) formed into dies 112. As described above, the HBMs may be configured to store data and allow memory accesses more quickly and efficiently than a standard DRAM or system memory. In one embodiment, the HBM dies 112 may be configured to provide processing-in-memory functionality. In various embodiments, the HBM dies 112 may be stacked vertically, one on-top of the other, with communication between the dies 112 occurring byway of through-silicon vias (TSV), microbumps, or other inter-chip communications (not shown).

In various embodiments, the stack 108 of HBMs 112 may include a HBM Controller die 110. The HBM Controller die 110 may be configured to perform standard memory access coordination functions (e.g., page table translations, address mapping, write combining, etc.). In various embodiments, the HBM Controller die 110 may include a memory management unit (MMU) that is focused upon the HBM dies 112.

In the illustrated embodiment, the system 100 may include a programmable or reprogrammable processing unit (PU or RPU) 106. In various embodiments, the RPU 106 may include logic circuits that may be dynamically programmed to perform various functions or execute certain instructions. In one embodiment, the RPU 106 may be configured to execute instructions that include controlling processing-in-memory functionality in the HBM dies 112. In various embodiments, the RPU 106 may include devices, such as, but not limited to, a field-programmable gate array (FPGA), an application-specific integrated circuit (ASIC), look-up table (LUT), Programmable Array Logic (PAL), etc. It is understood that the above are merely a few illustrative examples to which the disclosed subject matter is not limited.

In various embodiments, the RPU 106 may be stacked with or beneath the stack 108 of HBM dies 112. In such an embodiment, the RPU 106 may be configured to interface directly with the stack 108, and provide access to the stack 108 to other components of the system 100 (e.g., the fixed PU 104).

In various embodiments, the RPU 106 may provide coarse grain function or instruction execution reconfigurability. In another embodiment, the RPU 106 may provide fine grain function or instruction execution reconfigurability. In some embodiments, the operations performed by the RPU 106 may include controlling processing-in-memory functionality in the HBM dies 112 that may include, but is not limited to, multiply-accumulate operations, data shuffling, data transpositions, etc. It is understood that the above are merely a few illustrative examples to which the disclosed subject matter is not limited. In various embodiments, the RPU 106, and its close access to the HBM stack 108 may provide faster execution of instructions, tasks, or operations than a fixed or relatively remote processing unit or circuit.

In the illustrated embodiment, the system 100 may also include an unchangeable or fixed processing unit (FPU) 104. In such an embodiment, the FPU 104 may be configured to execute various instructions or perform logic operations. The FPU 104 may include logic circuits that are unchangeable or fixed, and which are statically formed during the manufacture of the FPU 104; although, various configuration settings may alter how the fixed logic circuits perform.

In various embodiments, the FPU 104 may include a specialized processing unit, such as, for example, a graphics processing unit (GPU), an encryption processing unit, a physics processing unit, a machine learning processing unit, etc. It is understood that the above are merely a few illustrative examples to which the disclosed subject matter is not limited. In various embodiments, the FPU 104 may be arranged alongside the stack 108 such that it does not directly communicate with it.

In various embodiments, the system 100 may also include an interposer die or layer 120. In such an embodiment, the interposer 120 may include silicon or another substrate, and may provide an avenue of communication between the FPU 104 and the RPU 106 (and stack 108). In such an embodiment, the interposer die 120 may be coupled with and beneath the RPU 106 and FPU 104 dies.

In the illustrated embodiment, the system 100 may include a package substrate die 122. The package substrate die 122 may be configured to communicate between the other components or dies, and externally to the system 100. The various dies 122, 120, 104, 106, etc. may be connected by a plurality of solder bumps 124.

Figure 2:
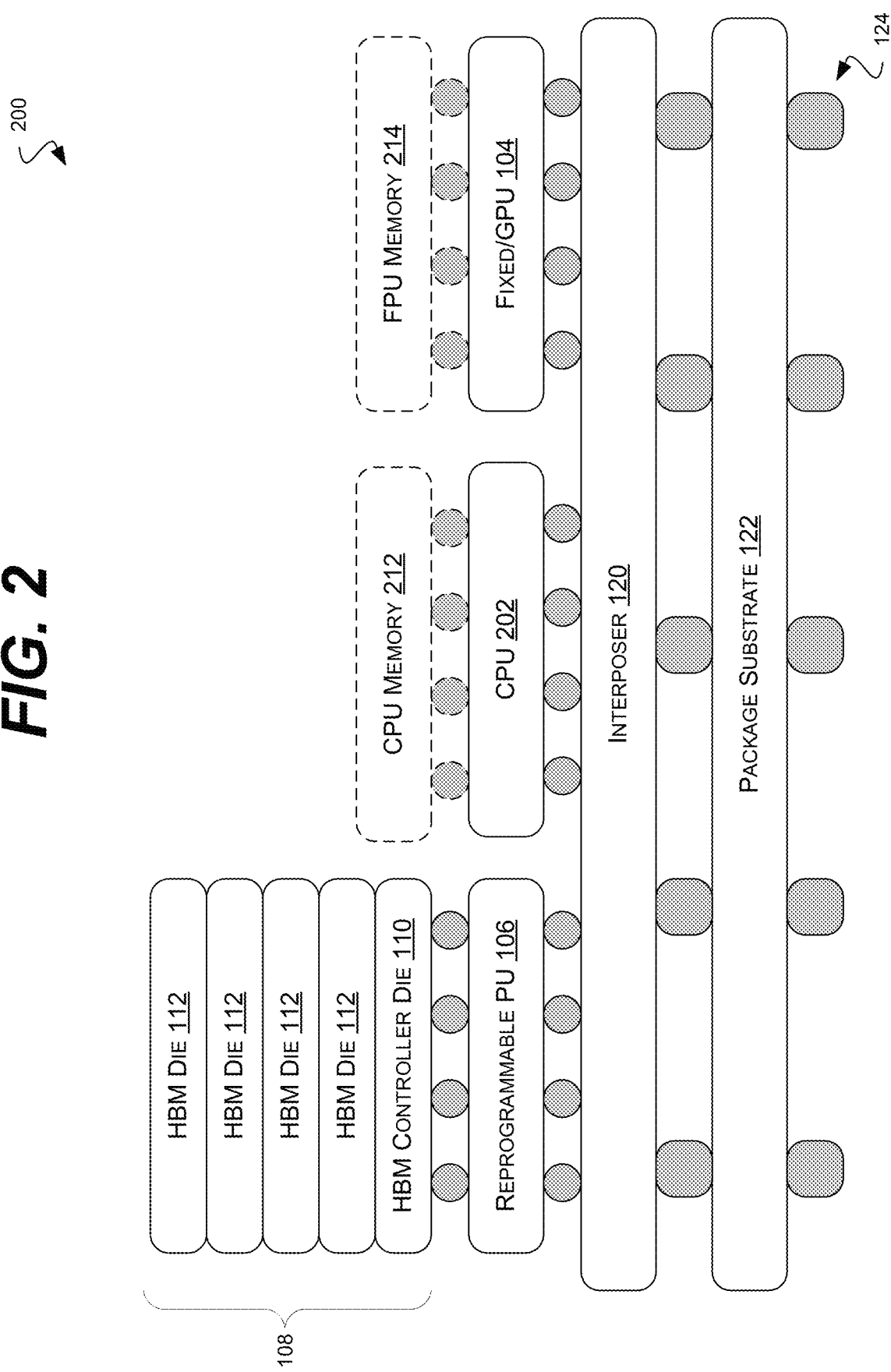
FIG. 2 is a block diagram of an example embodiment of a system in accordance with the disclosed subject matter.

FIG. 2 is a block diagram of an example embodiment of a system 200 in accordance with the disclosed subject matter. In the illustrated embodiment, the system 200 may include a plurality of integrated circuit (IC) dies. In such an embodiment, the ICs may be arranged in a multi-chip module (MCM).

In the illustrated embodiment, the system 200 may include a stack 108 of HBM dies 112 and HBM controller die 110, an RPU 106, a FPU 104, an interposer 120 and a package substrate 122, as described above. In the illustrated embodiment, a number of possible additional dies or components are shown. In various embodiments, one or more of these dies, as described below, may be include in the system 200. In another embodiment, one or more of these dies or components may be included as part of another IC package or as a part of a larger system (e.g., a central processing unit and/or system memory may be included as part of a desktop or laptop computer).

In various embodiments, the system 200 may also include a central processing unit (CPU) 202. In such an embodiment, the CPU 202 may be included in a die and may include a microprocessor and/or a plurality of processor cores. The CPU 202 may be the primary component of a system that processes and manages instructions. The CPU 202 may primarily be responsible for executing the operating system and applications. In various embodiments, the CPU 202 may include a general purpose computing architecture such as those made by ARM or Intel. It is understood that the above are merely a few illustrative examples to which the disclosed subject matter is not limited. In the illustrated embodiment, the CPU 202 may be configured to control the heterogeneous computing environment of system 200, and assign computational tasks between a FPU 104 and the RPU 106.

In various embodiments, the system 200 may include a CPU memory die 212. In some embodiments, the CPU memory die 212 may be stacked upon the CPU 202. In such an embodiment, the CPU memory 212 may be configured to store data and may be directly accessed by the CPU 202. In some embodiments, the CPU memory 212 may include a system memory. In another embodiment, a system memory (e.g., DRAMs) may be external to the system 200.

In various embodiments, the system 200 may include a FPU memory die 214. In some embodiments, the FPU memory die 214 may be stacked upon the FPU 104. In such an embodiment, the FPU memory 214 may be configured to store data and may be directly accessed by the FPU 104.

In various embodiments, the three processors of system 200 (RPU 16, FPU 104, and CPU 202) may allocate amongst themselves the execution of various computing tasks, instructions, or kernels. In this context, "kernel" is defined as one or more instructions that are grouped together to perform a task or definable sub-task. The bounds of a kernel may or may not coincide with a subroutine and should not be assumed to be synonymous terms. In this context, the term "kernel" is more akin to the term "compute kernel" and should not be confused with other definitions of "kernel" such as "operating system kernel", "kernel method", "image kernel", or the many definitions of kernel employed in mathematics.

In such an embodiment, the three processors of system 200 (RPU 16, FPU 104, and CPU 202) may distribute tasks to improve efficiency, power usage, and memory bandwidth consumption. In various embodiments, this may be similar (but not identical) to the ARM big.LITTLE heterogeneous computing architecture, in which battery-saving and slower processor cores (LITTLE) are coupled with relatively more powerful and power-hungry processor cores (big). In such an embodiment, workloads can be swapped between different types of cores (e.g., between big and LITTLE cores, RPU 106, FPU 104 and CPU 202, etc.). In such an embodiment, a multi-core system 200 may adjust to dynamic computing needs and use less power (or be faster). It is understood that the above are merely a few illustrative examples to which the disclosed subject matter is not limited.

Figure 3:
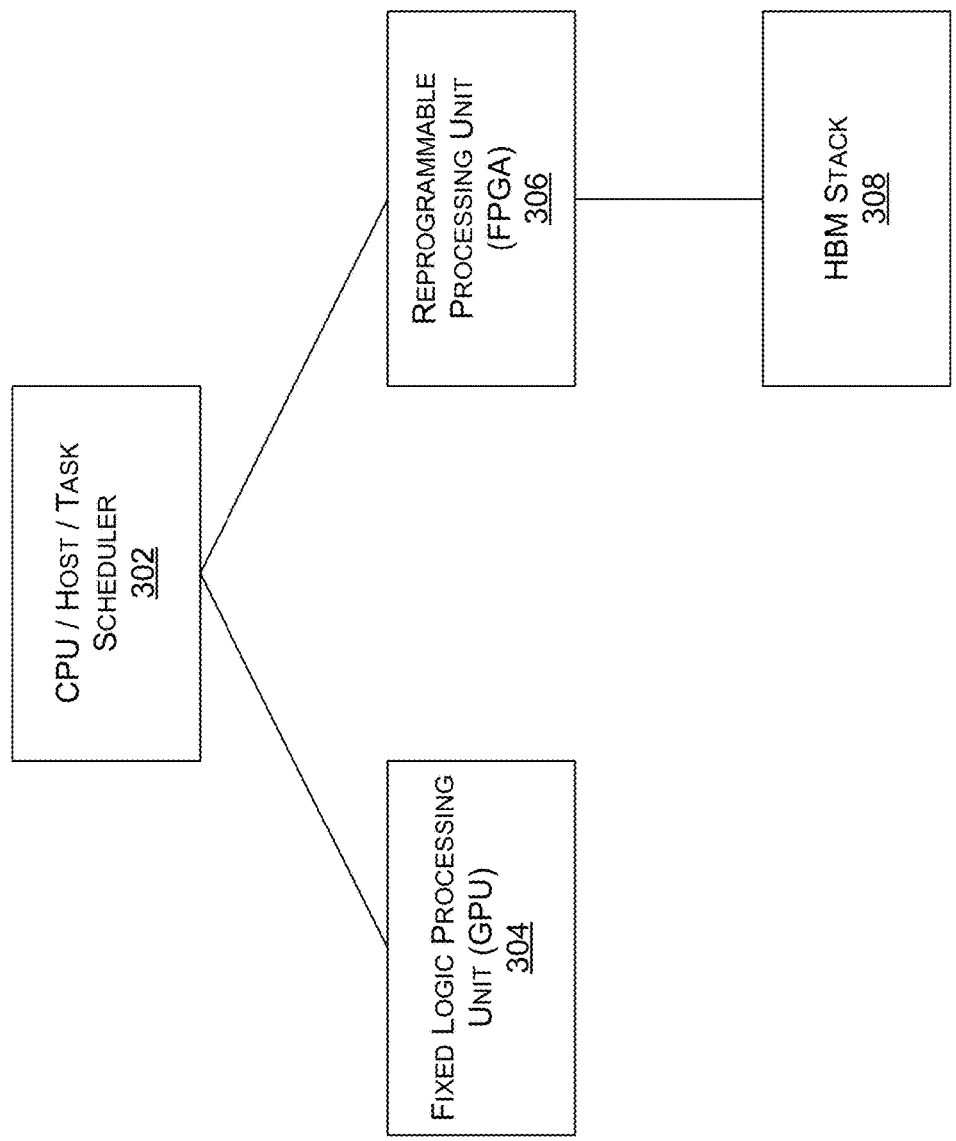
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may be comprised of the dies illustrated in FIGS. 1 and/or 2 or other ICs.

In the illustrated embodiment, the system 300 may include a CPU, a host processor, or task scheduler 302 configured to assign computational tasks between a fixed processing unit 304 and a reprogrammable processing unit 306. In various embodiments, the task scheduler 304 may be configured to control, at least in part, the system 300. In various embodiments, the task scheduler 302 may include a processor (e.g., a CPU), but in another embodiment, the task scheduler 302 may include a less general purpose circuit.

In the illustrated embodiment, the system 300 may include a fixed logic processing unit 304 (e.g., GPU, digital signal processor (DSP), etc.), as described above. The system 300 may include a RPU 306 (e.g., FPGA, etc.), as described above. The system 300 may also include a HBM stack 308, as described above.

In the illustrated embodiment, the FPU 304 and RPU 306 may be configured to have an integrated control and/or data path. In such an embodiment, computing tasks (and the data associated therein) may be transferred or handed off between the two processors 304 and 306. As described below, in various embodiments, the task and data switching may occur in a self-regulated fashion or may be coordinated by the CPU 302.

In the illustrated embodiment, the FPU 304 may allow a programmer or user to make use of known FPU (e.g., GPU) programming models or application programming interfaces (APIs), and the data access protocols or models associated with the FPU. Whereas, the re-programmability of the RPU 304 may allow task specific circuitry that increases efficiency (e.g., power, time, etc.) and may be dynamically changed.

Figure 4:
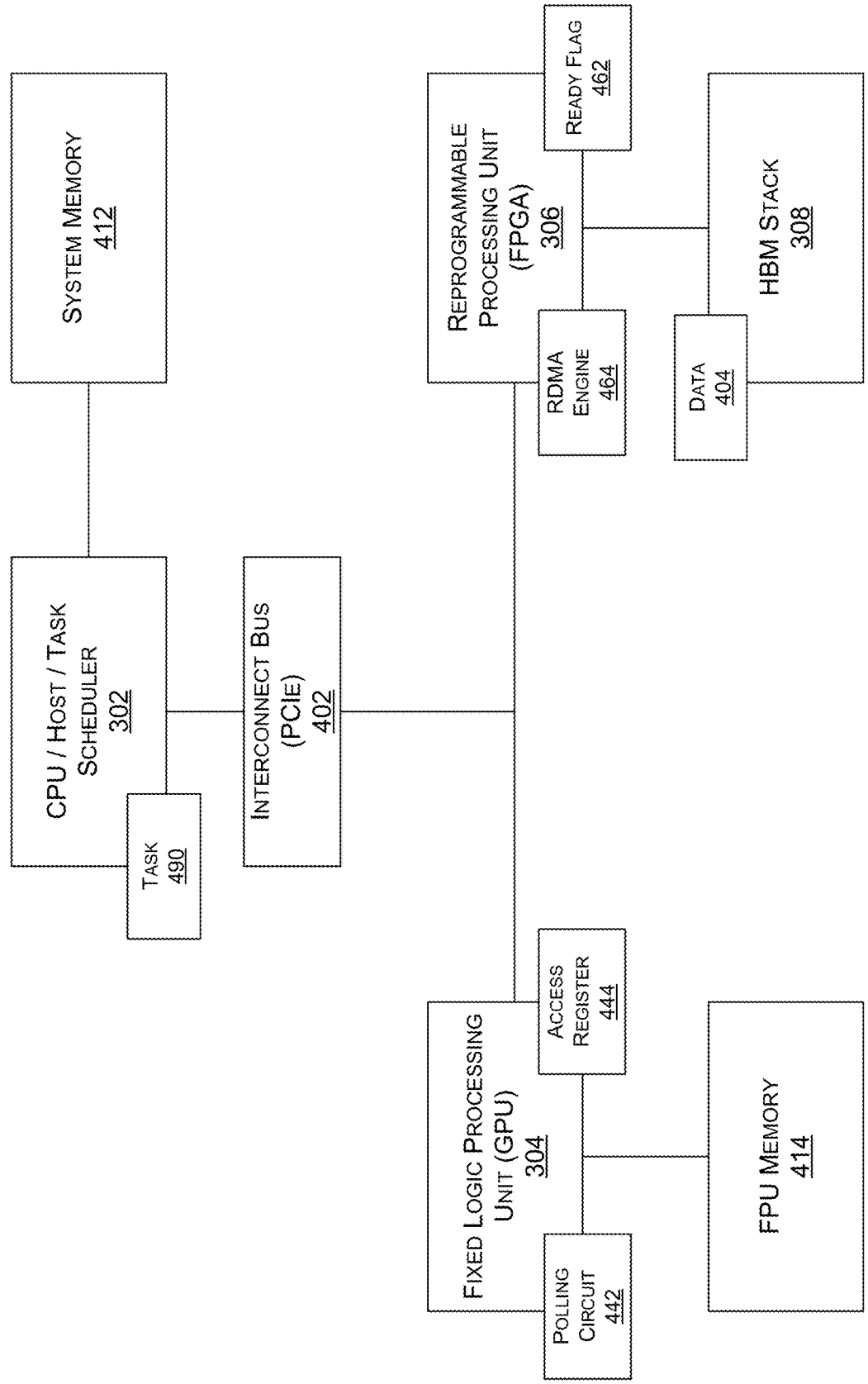
FIG. 4 is a block diagram of an example embodiment of a system in accordance with the disclosed subject matter.

FIG. 4 is a block diagram of an example embodiment of a system 400 in accordance with the disclosed subject matter. In various embodiments, portions of the system 400 may be comprised of the dies illustrated in FIGS. 1 and/or 2 or other ICs. The system 400 may illustrate one embodiment of the task transfer briefly shown in FIG. 3.

In the illustrated embodiment, the system 400 may include a fixed logic processing unit 304 (e.g., GPU, digital signal processor (DSP), etc.), as described above. The system 400 may include a RPU 306 (e.g., FPGA, etc.), as described above. The system 400 may also include a HBM stack 308, as described above.

In the illustrated embodiment, the system 400 may also include a system memory 412 configured to store data, and directly accessed by (or under the control of) the CPU 302. The system 400 may include a FPU memory 414 configured to store data, and directly accessed by (or under the control of) the FPU 304.

In the illustrated embodiment, the CPU 302 may be coupled with the FPU 304 and RPU 306 via an interconnect bus 402. In various embodiments, the interconnect bus 402 may make use of a serial protocol, such as, for example, the Peripheral Component Interconnect Express (PCIe) protocol. It is understood that the above is merely one illustrative example to which the disclosed subject matter is not limited.

In the illustrated embodiment, CPU (or task scheduler) 302 may assign a first task, sub-task, or portion of a task 490 to the FPU 304. The FPU 304 may begin to execute the instructions associated with that first sub-task and may desire to access the data 404 associated with the task 490. In the illustrated embodiment, the data 404 may be stored in the HBM stack 308.

In the illustrated embodiment, the RPU 306 may include a direct memory access (DMA) or remote DMA (RMDA) engine or circuit 464. As the RPU 306 is coupled directly with the HBM stack 308, the RPU 306 may gate access to the HB stack 308. In various embodiments, if the RPU 306 implements a RDMA engine 464, other processors may perform DMA calls or requests to the HBM stack through the RPU 306. The RDMA engine 464 may then service or perform the DMA requests.

In the illustrated embodiment, the FPU 304 may make RDMA access requests to the RDMA engine 464. The RDMA may then retrieve or read the data 404 from the HBM stack 308 and supply it to the FPU 304. In various embodiments, the FPU 304 may include one or more access registers 444. In such an embodiment, the data 404 (or portions thereof) may be staged or buffered in the access registers 444 (e.g., in 256 megabyte portions). The data 404 may then be copied into the FPU memory 414. The FPU 304 may then execute the assigned portion of task 490 on the data 404.

In the illustrated embodiment, the CPU (or task scheduler) 302 may assign a second task, sub-task, or portion of a task 490 to the RPU 306. In various embodiments, the RPU 306 may be programmed with logic circuits that make execution of the second portion on the RPU 306 efficient or otherwise desirable. For example, the portion of the task 490 assigned to the RPU 306 may include controlling processing-in-memory functionality of the HBM dies of the HBM stack 308. Once the FPU 304 completes its first portion of the task 490, the FPU 304 pauses to offload the kernel or transfer execution of the rest of the task 490 to the RPU 306.

In the illustrated embodiment, the RPU 306 may include a ready flag 462 or some other indication that it is ready to start processing the second portion of task 490. In some embodiments, the RPU 306 may include a number of ready flags 462, each associated with various logic circuits that may respectively execute tasks. The FPU 304 may include a polling circuit 442 configured to periodically check or poll the RPU 306 (e.g., the ready flag 462) to see if the time is right to transfer processing of the task 490 to the RPU 306. In various embodiments, another flag-based synchronization protocol may be employed.

Once the FPU 304 recognizes that the RPU 306 is ready, the ownership of the task 490 or the data 404 may be transferred between the two processors 304 and 306. The RPU 306 may then start execution of its assigned second portion of task 490. In various embodiments, the CPU 302 may be configured to inform the FPU 304 that the RPU 306 may be ready to start execution of the second portion of the task 490. In such an embodiment, the RPU 306 may inform the CPU 302 of this, or the CPU 302 may monitor the status of RPU 306 (e.g., the CPU 302 may be aware the RPU 306 has completed another task).

In various embodiments, the data 404 may be transferred from the FPU memory 414 to the HBM stack 308 using the RDMA protocol described above. The RPU 306 may then directly access the data 404 stored in the HBM stack 308. While the RPU 306 executes the second portion of the task 490 the FPU 304 may pause or stall, or may asynchronously execute another task, such that FPU 304's computing power is not wasted. It is understood that the above are merely a few illustrative examples to which the disclosed subject matter is not limited.

In some embodiments, task execution may be switched from the RPU 306 to the FPU 304 (or to the PCU 302) in a similar manner but in reverse. In such an embodiment, the data synchronization between the FPU 304, RPU 306, and even the CPU 302 may occur similarly to that described above.

Figure 5:
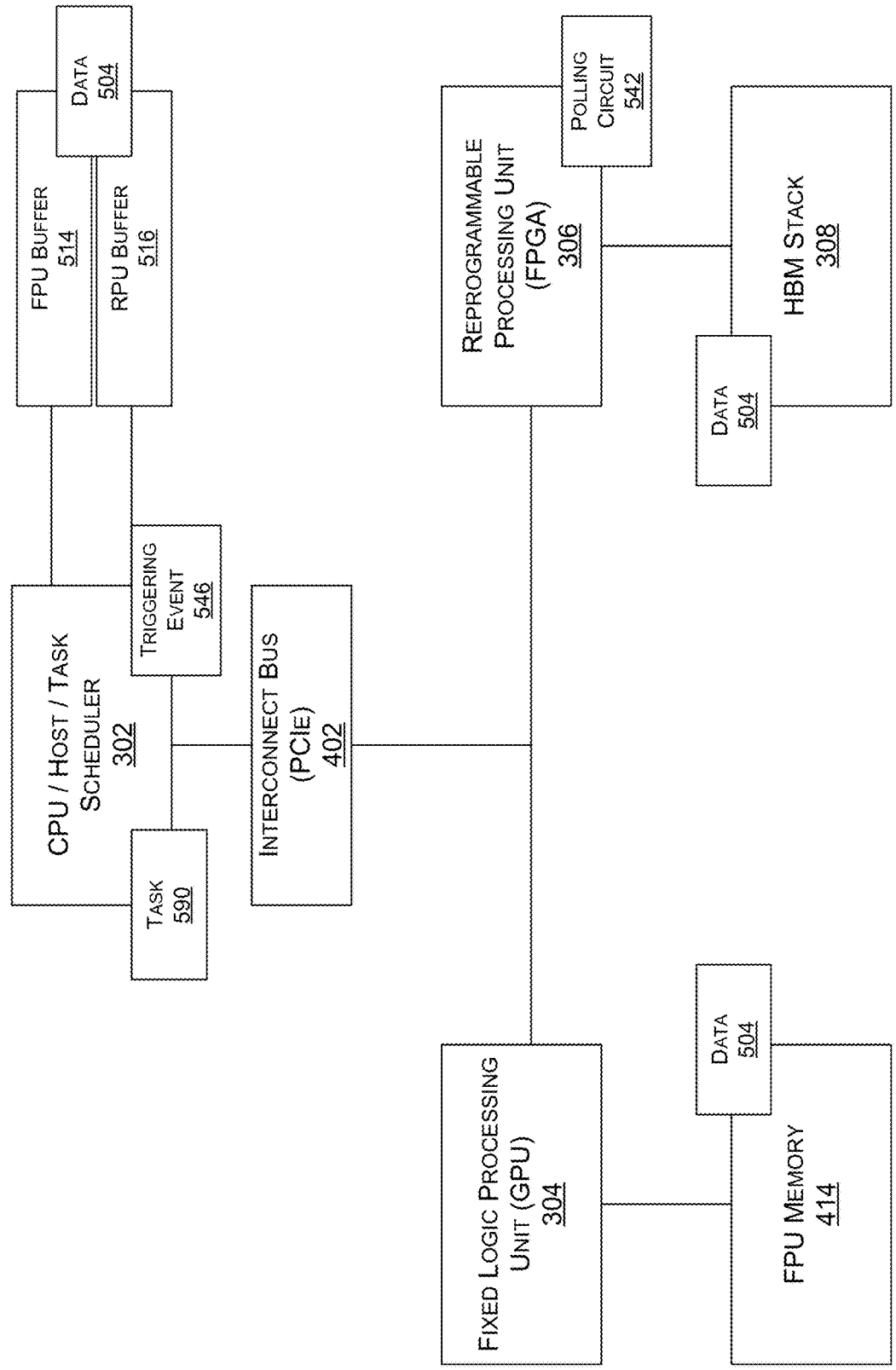
FIG. 5 is a block diagram of an example embodiment of a system in accordance with the disclosed subject matter.

FIG. 5 is a block diagram of an example embodiment of a system 500 in accordance with the disclosed subject matter. In various embodiments, portions of the system 500 may be comprised of the dies illustrated in FIGS. 1 and/or 2 or other ICs. The system 500 may illustrate one embodiment of the task transfer briefly shown in FIG. 3.

In the illustrated embodiment, the system 500 may include a fixed logic processing unit 304 (e.g., GPU, digital signal processor (DSP), etc.), as described above. The system 500 may include a RPU 306 (e.g., FPGA, etc.), as described above. The system 500 may also include a HBM stack 308, as described above.

In the illustrated embodiment, the system 500 may include a FPU memory 414 configured to store data, and directly accessed by (or under the control of) the FPU 304. The system 500 may include an FPU buffer or memory 514 configured to store data related to the FPU 304. The system 500 may include an RPU buffer or memory 516 configured to store data related to the RPU 306. In such an embodiment, the FPU buffer 514 and RPU buffer 516 may be controlled or accessible by the CPU 302. In various embodiments, the FPU buffer 514 and RPU buffer 516 may be partitions or regions of a system memory (e.g., that shown in FIG. 4) or may be separate memory circuits.

In the illustrated embodiment, the CPU 302 may be coupled with the FPU 304 and RPU 306 via an interconnect bus 402. In various embodiments, the interconnect bus 402 may make use of a serial protocol, such as, for example, the Peripheral Component Interconnect Express (PCIe) protocol. It is understood that the above is merely one illustrative example to which the disclosed subject matter is not limited.

As described above, the CPU 302 (or task scheduler) may distribute or assign various tasks 590 or portions of task 590 to the FPU 304 and RPU 306 for execution. In various embodiments, this assignment may be based, at least in part, upon which processor is available and more efficient to execute the task 590. As described above, the CPU 302 may assign the FPU 304 a first portion of the task 590 and a second portion of the task 590 to the RPU 306. For example, portions of the various task 590 assigned to the RPU 306 may include controlling processing-in-memory functionality of the HBM dies of the HBM stack 308. It is understood that the above are merely a few illustrative examples to which the disclosed subject matter is not limited.

In the illustrated embodiment, the FPU 304 may execute the assigned task, as described above. In such an embodiment, the FPU 304 may make use of the FPU memory 414 as a temporary cache or working memory. When the assigned task, sub-task, or portion of task 590 is completed, the FPU 304 may write the data 504 to the FPU buffer 514.

In such an embodiment, this may involve the CPU 302 acting as an intermediary between the FPU 304 and the FPU buffer 514, or at least being informed that the data 504 is being written to the FPU buffer 514. In some embodiments, this may be done via a memory allocation function or procedure call (e.g., in the GPU case a CUDAMalloc( ) call may be made). In such an embodiment, the FPU 304 may copy the data to the CPU 302, and the CPU 302 may in turn copy the data to the FPU buffer 514.

In the illustrated embodiment, the CPU 302 may then transfer the data 504 from the FPU buffer 514 to the RPU buffer 516. In such an embodiment, the CPU 302 may control the timing of the data transfer and synchronization between the FPU 304 and the RPU 306 (at least between the buffers 514 and 516).

In the illustrated embodiment, when the copying of the data 504 between the buffers 514 and 516 is complete, the CPU 302 may initiate a triggering event 546 to indicate to the RPU 306 that data 504 is ready. In various embodiments, this triggering event 546 may include an interrupt signal, a message across the interconnect bus, or a signal to the RPU 306. In the illustrated embodiment, the RPU 306 may include a polling circuit 542 configured to detect and react to the triggering event 546. Again, in such an embodiment, the CPU 302 may control the timing of the data transfer. In various embodiments, the polling circuit 542 may work in conjunction with a RPU-related driver or firmware. It is understood that the above is merely one illustrative example to which the disclosed subject matter is not limited.

In such an embodiment, once the triggering event 546 has occurred, the RPU 306 may copy the data 504 from the RPU buffer 516 to the HBM stack 308. The RPU 306 may then execute the task, sub-task or portion of the task 590 assigned to it. As described earlier, the portion of the task 590 assigned to the RPU 306 may include controlling processing-in-memory functionality of the HBM dies of the HBM stack 308. While the RPU 306 executes the second portion of the task 590 the FPU 304 may pause or stall, or may asynchronously execute another task, such that FPU 304's computing power is not wasted. It is understood that the above are merely a few illustrative examples to which the disclosed subject matter is not limited.

In some embodiments, task execution may be switched from the RPU 306 to the FPU 304 (or to the PCU 302) in a similar manner but in reverse. In such an embodiment, the data synchronization between the FPU 304, RPU 306, and even the CPU 302 may occur similarly to that described above.

Figure 6:
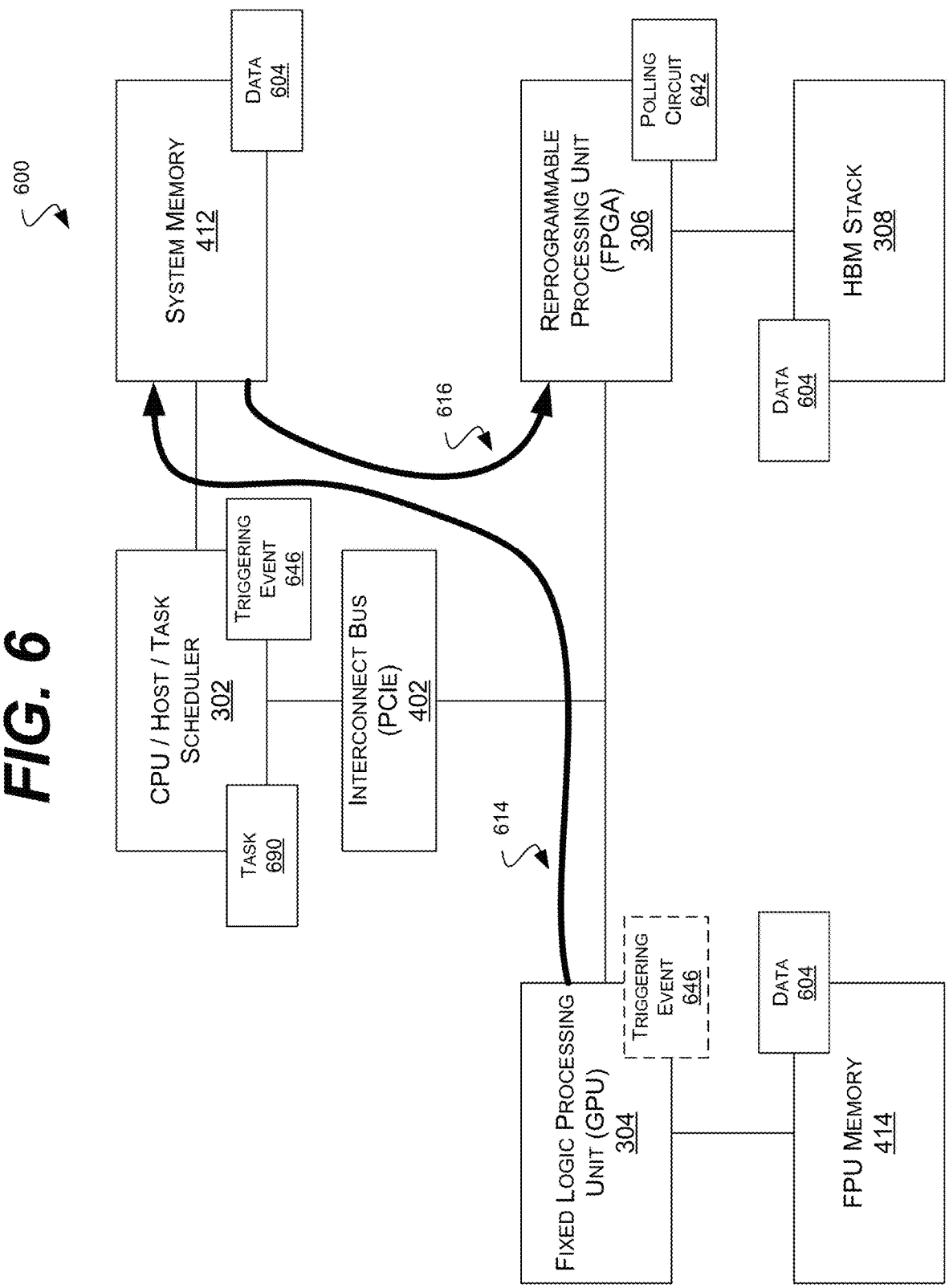
FIG. 6 is a block diagram of an example embodiment of a system in accordance with the disclosed subject matter.

FIG. 6 is a block diagram of an example embodiment of a system 600 in accordance with the disclosed subject matter. In various embodiments, portions of the system 500 may be comprised of the dies illustrated in FIGS. 1 and/or 2 or other ICs. The system 500 may illustrate one embodiment of the task transfer briefly shown in FIG. 3.

In the illustrated embodiment, the system 600 may include a fixed logic processing unit 304 (e.g., GPU, digital signal processor (DSP), etc.), as described above. The system 600 may include a RPU 306 (e.g., FPGA, etc.), as described above. The system 600 may also include a HBM stack 308, as described above.

In the illustrated embodiment, the system 600 may include a FPU memory 414 configured to store data, and directly accessed by (or under the control of) the FPU 304. The system 600 may include a system memory 412, as described above.

In the illustrated embodiment, the CPU 302 may be coupled with the FPU 304 and RPU 306 via an interconnect bus 402. In various embodiments, the interconnect bus 402 may make use of a serial protocol, such as, for example, the Peripheral Component Interconnect Express (PCIe) protocol. It is understood that the above is merely one illustrative example to which the disclosed subject matter is not limited.

As described above, the CPU 302 (or task scheduler) may distribute or assign various tasks 690 or portions of task 690 to the FPU 304 and RPU 306 for execution. In various embodiments, this assignment may be based, at least in part, upon which processor is available and more efficient to execute the task 690. As described above, the CPU 302 may assign the FPU 304 a first portion of the task 690 and a second portion of the task 690 to the RPU 306. For example, the portion of the task 690 assigned to the RPU 306 may include controlling processing-in-memory functionality of the HBM dies of the HBM stack 308. It is understood that the above are merely a few illustrative examples to which the disclosed subject matter is not limited.

In the illustrated embodiment, the FPU 304 may execute the assigned task, as described above. In such an embodiment, the FPU 304 may make use of the FPU memory 414 as a temporary cache or working memory. When the assigned task, sub-task, or portion of task 690 is completed, the FPU 304 may write the data 604 to the system memory 412.

In the illustrated embodiment, the FPU 304 may access the system memory 412 via a remote direct memory access (RDMA). In various embodiments, this may essentially bypass the CPU 302, or at least the active involvement of the CPU 302. Arrow 614 shows the FPU 304 writing the data 604 directly (or using a DMA engine of the CPU 302) to the system memory 412.

Upon completion of the data write to the system memory 412, a triggering event 646 (e.g., an interrupt, etc.) may be initiated to inform the RPU 306 that the data 604 is ready for its use. In various embodiments, the triggering event 646 may be created by the CPU 302, as described above. In another embodiment, the triggering event 646 may be created by the FPU 304.

In the illustrated embodiment, the RPU 306 may include a polling circuit 542 to detect when the triggering event 646 occurs. In such an embodiment, the RPU 306 may then copy the data 504 from the system memory 412 to the HBM stack 308 (illustrated by arrow 616). In various embodiments, this may be done via a RMDA. In such an embodiment, the RPU 306 may include an RDMA engine as shown in FIG. 4.

The RPU 306 may then execute the task, sub-task or portion of the task 590 assigned to it, which may include controlling the processing-in-memory functionality of the HBM dies of the HBM memory 308. While the RPU 306 executes the second portion of the task 590 the FPU 304 may pause or stall, or may asynchronously execute another task, such that FPU 304's computing power is not wasted. It is understood that the above are merely a few illustrative examples to which the disclosed subject matter is not limited.

In some embodiments, task execution may be switched from the RPU 306 to the FPU 304 (or to the PCU 302) in a similar manner but in reverse. In such an embodiment, the data synchronization between the FPU 304, RPU 306, and even the CPU 302 may occur similarly to that described above.

Figure 7:
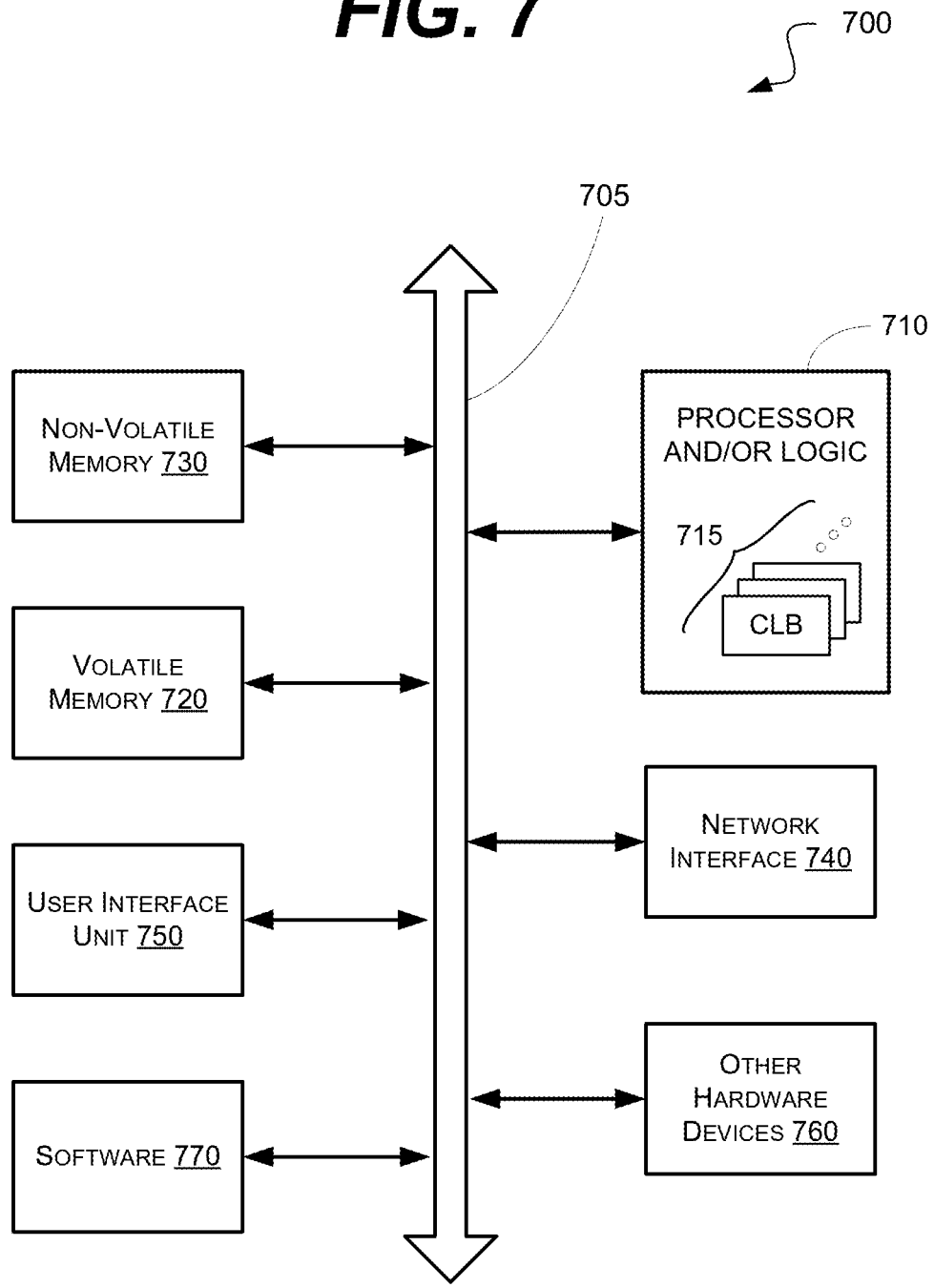
FIG. 7 is a schematic block diagram of an information processing system that may include devices formed according to principles of the disclosed subject matter.

FIG. 7 is a schematic block diagram of an information processing system 5x00, which may include semiconductor devices formed according to principles of the disclosed subject matter.

Referring to FIG. 7, an information processing system 700 may include one or more of devices constructed according to the principles of the disclosed subject matter. In another embodiment, the information processing system 700 may employ or execute one or more techniques according to the principles of the disclosed subject matter.

In various embodiments, the information processing system 700 may include a computing device, such as, for example, a laptop, desktop, workstation, server, blade server, personal digital assistant, smartphone, tablet, and other appropriate computers or a virtual machine or virtual computing device thereof. In various embodiments, the information processing system 700 may be used by a user (not shown).

The information processing system 700 according to the disclosed subject matter may further include a central processing unit (CPU), logic, or processor 710. In some embodiments, the processor 710 may include one or more functional unit blocks (FUBs) or combinational logic blocks (CLBs) 715. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 700 according to the disclosed subject matter may further include a volatile memory 720 (e.g., a Random Access Memory (RAM)). The information processing system 700 according to the disclosed subject matter may further include a non-volatile memory 730 (e.g., a hard drive, an optical memory, a NAND or Flash memory). In some embodiments, either the volatile memory 720, the non-volatile memory 730, or a combination or portions thereof may be referred to as a "storage medium". In various embodiments, the volatile memory 720 and/or the non-volatile memory 730 may be configured to store data in a semi-permanent or substantially permanent form.

In various embodiments, the information processing system 700 may include one or more network interfaces 740 configured to allow the information processing system 700 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 700 according to the disclosed subject matter may further include a user interface unit 750 (e.g., a display adapter, a haptic interface, a human interface device). In various embodiments, this user interface unit 750 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 700 may include one or more other devices or hardware components 760 (e.g., a display or monitor, a keyboard, a mouse, a camera, a fingerprint reader, a video processor). It is understood that the above are merely a few illustrative examples to which the disclosed subject matter is not limited.

The information processing system 700 according to the disclosed subject matter may further include one or more system buses 705. In such an embodiment, the system bus 705 may be configured to communicatively couple the processor 710, the volatile memory 720, the non-volatile memory 730, the network interface 740, the user interface unit 750, and one or more hardware components 760. Data processed by the processor 710 or data inputted from outside of the non-volatile memory 730 may be stored in either the non-volatile memory 730 or the volatile memory 720.

In various embodiments, the information processing system 700 may include or execute one or more software components 770. In some embodiments, the software components 770 may include an operating system (OS) and/or an application. In some embodiments, the OS may be configured to provide one or more services to an application and manage or act as an intermediary between the application and the various hardware components (e.g., the processor 710, a network interface 740) of the information processing system 700. In such an embodiment, the information processing system 700 may include one or more native applications, which may be installed locally (e.g., within the non-volatile memory 730) and configured to be executed directly by the processor 710 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 710.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus, comprising:
   a computing environment controlled, at least in part, by a task scheduler, the computing environment comprising:
   the task scheduler;
   a processing unit having logical circuits configured to execute instructions;
   a reprogrammable processing unit having reprogrammable logical circuits configured to execute instructions that include instructions to control processing-in-memory functionality; and
   at least one high-bandwidth memory die, configured to provide processing-in-memory functionality controllable by the reprogrammable processing unit;
   wherein the task scheduler is configured to schedule a first portion of a computational task for the processing unit and a second portion of the computational task for the reprogrammable processing unit, and wherein the reprogrammable processing unit is further configured to determine the occurrence of a triggering event and copy data for the second portion of the computational task, based on the triggering event, from central memory to the high-bandwidth memory die, wherein the triggering event is based on the first portion of the computational task.

2. The apparatus of claim 1, wherein the processing unit comprises a graphical processing unit.

3. The apparatus of claim 1, wherein the processing unit comprises a register memory configured to stage data accesses from the high-bandwidth memory die.

4. The apparatus of claim 1, wherein the task scheduler is configured to cause the processing unit to execute a first portion of a task, and the reprogrammable processing unit to execute a second portion of the task, wherein the processing unit is configured to pause execution of the task, and wait to offload execution of the task to the reprogrammable processing unit based, at least in part, upon a flag based synchronization protocol.

5. The apparatus of claim 4, wherein the processing unit is configured to poll the reprogrammable processing unit to determine if the reprogrammable processing unit is ready to execute the task.

6. The apparatus of claim 4, wherein the task scheduler is further configured to inform the processing unit that the reprogrammable processing unit is ready to execute the task.

7. An apparatus, comprising:
a computing environment controlled, at least in part, by a central processing unit, the computing environment comprising:
the central processing unit configured to assign a first portion of a computational task to a fixed processing unit, and a second portion of the computational task to a reprogrammable processing unit;
the fixed processing unit having logical circuits configured to execute instructions;
the reprogrammable processing unit having reprogrammable logical circuits configured to execute instructions that include instructions to control processing-in-memory functionality;
at least one high-bandwidth memory die configured to provide processing-in-memory functionality controllable by the reprogrammable processing unit; and
a central memory comprising a buffer portion reserved for the fixed processing unit, and a buffer portion reserved for the reprogrammable processing unit;
wherein the reprogrammable processing unit is configured to copy data from the central memory to the high-bandwidth memory die to execute the second portion of the computational task upon the data, and
wherein the reprogrammable processing unit is further configured to determine the occurrence of a triggering event and copy data for the second portion of the computational task, based on the triggering event, from central memory to the high-bandwidth memory die, wherein the triggering event is based on the first portion of the computational task.

8. The apparatus of claim 7, wherein the central processing unit is further configured to assign a first task to the fixed processing unit for execution;
wherein the fixed processing unit is configured to, based on the execution of the first task being at least partially complete, copy data to the central processing unit;

wherein the central processing unit is further configured to assign a second task to the reprogrammable processing unit for execution and make the data available to the reprogrammable processing unit.

9. The apparatus of claim 8, wherein the central processing unit is further configured to copy the data from the buffer portion reserved for the fixed processing unit to the buffer portion reserved for the reprogrammable processing unit.

10. The apparatus of claim 7, wherein the central processing unit is further configured to control, at least in part, the timing of any data transferred between the fixed processing unit and reprogrammable processing unit.

11. The apparatus of claim 7, wherein the computing environment is configured such that the fixed processing unit does not directly access the high-bandwidth memory die.

12. A system, comprising:
a central processing unit being configured to assign computational tasks to processing units of a computing environment; and
a system memory being configured to store data;
the computing environment comprising:
a fixed processing unit having logical circuits configured to execute instructions,
a reprogrammable processing unit having reprogrammable logical circuits configured to execute instructions that include instructions to control processing-in-memory functionality, and
at least one high-bandwidth memory die configured to provide processing-in-memory functionality controllable by the reprogrammable processing unit,
wherein the central processing unit is further configured to assign a first portion of a computational task to the fixed processing unit and a second portion of the computational task to the reprogrammable processing unit, and
wherein the reprogrammable processing unit is configured to determine the occurrence of a triggering event and copy data for the second portion of the computational task, based on the triggering event, from system memory to the high-bandwidth memory die, wherein the triggering event is based on the first portion of the computational task.

13. The system of claim 12, wherein the fixed processing unit is configured to, based on the execution of a task assigned to the fixed processing unit being at least partially complete, copy data to the system memory; and
wherein the reprogrammable processing unit is configured to copy the data from the system memory to the high-bandwidth memory die to execute a task assigned to the reprogrammable processing unit that requires the data.

14. The system of claim 13, wherein the fixed processing unit is configured to copy the data to the system memory via a remote direct memory access.

15. The system of claim 12, wherein the fixed processing unit includes a graphical processing unit; and
the reprogrammable processing unit includes a field programmable gate array.

16. The system of claim 12, wherein the central processing unit is configured to assign a first portion of a task to the fixed processing unit for execution, and a second portion of the task to the reprogrammable processing unit for execution; and
wherein the fixed processing unit is configured to halt execution of tasks between the time the first portion of the task is complete and the time the second portion of the task is complete.

* * * * *